United States Patent [19]

Mixell

[11] 3,933,724

[45] Jan. 20, 1976

[54] SEALING COMPOUNDS

[75] Inventor: Ronald G. Mixell, Muncie, Ind.

[73] Assignee: Ball Corporation, Muncie, Ind.

[22] Filed: Dec. 4, 1974

[21] Appl. No.: 529,446

Related U.S. Application Data

[63] Continuation of Ser. No. 99,529, Dec. 18, 1970, abandoned.

[52] U.S. Cl......... 260/33.6 A; 260/42.47; 260/83.7; 260/93.1; 260/829; 260/894
[51] Int. Cl.$^2$.. C08K 5/01; C08L 9/06; C08L 45/02
[58] Field of Search........... 260/42.25, 33.6 A, 93.1, 260/829, 894, 42.47, 83.7; 106/307; 423/445; 215/341

[56] References Cited
UNITED STATES PATENTS

| | | | |
|---|---|---|---|
| 2,503,972 | 4/1950 | Simons | 260/93.1 |
| 2,576,968 | 12/1951 | Pike et al. | 260/33.6 A |
| 2,643,235 | 6/1953 | Brams | 260/27 |
| 2,692,245 | 10/1954 | Groves et al. | 260/3 |
| 2,996,441 | 8/1961 | Nelson et al. | 260/93.1 |
| 3,519,585 | 7/1970 | Miller | 260/27 |
| 3,629,221 | 12/1971 | Arakawa et al. | 260/93.1 |

OTHER PUBLICATIONS

Kirk–Othmer—Encyclopedia of Chem. Technology (2nd ed.) (Vol. 4), (Interscience) (N.Y.) (1964), p. 153.
Polymer Additives—(Noyes Data Corp.) (Park Ridge, N.J.) (1972), p. 197.

*Primary Examiner*—Donald E. Czaja
*Assistant Examiner*—H. H. Fletcher
*Attorney, Agent, or Firm*—Gilbert E. Alberding

[57] ABSTRACT

This invention relates to compositions and methods of making compositions useful as sealants in food containers comprising a mixture of SBR polymer, resin, filler, and a solvent, which compositions without the solvent can be stably stored and shipped in dry form. Also, charcoal can be admixed in situ to protect against taste and odor transfer to foods.

14 Claims, No Drawings

SEALING COMPOUNDS

This is a continuation of application Ser. No. 99,529, filed Dec. 18, 1970, now abandoned.

BACKGROUND OF THE INVENTION

Field of the Invention

Various cans are conventionally formed of a cylindrical body portions with at least one separate end portion secured thereto to complete the can. It is necessary to seal the juncture between the can body and the can end with a sealant which must meet a number of demanding requirements. These requirements are particularly stringent with respect to cans employed as food containers. Compositions for sealing can ends have long been known. Originally, solid rubber gaskets were inserted in canning lids. These separate gaskets, although somewhat effective, were inconvenient from many viewpoints, including additional handling procedures and costs. Placing the gaskets within the lids was time consuming and did not permit high-speed formation of lids with a sealant.

Compositions were devised for formation of sealants directly on the canning lid. These compositions were deposited on the canning lids by various methods to provide high speed means of making can ends incorporating the sealing compound thereon.

Plastisol compositions are well known for such use as sealing compounds on can ends. However, plastisol compositions, as other compositions, display drawbacks and shortcomings including chemical reactivity with container contents, particularly where the composition imparts a taste or odor to food, poor pouring properties incompatible with high speed production, and instability of the composition resulting in short shelf life. Often such components were not resistent to heat degradation under conditions normally encountered during processing.

Other types of compositions utilized include emulsion systems. However, emulsion systems also experience one or more of the above problems, particularly instability in storage.

While emulsion systems are somewhat more stable in the presence of a solvent as opposted to the "dry" form, a dry composition is desirable for the shipping and storage accruing from the weight and bulk savings from such form. It is simple matter to blend the dry composition with the solvent at the time of use.

Summarily, the known sealants involve compromise between convenience, stability, taste inertness, chemical inertness in place, bulk and weight.

SUMMARY OF THE INVENTION

This invention relates to compositions, and methods of preparing such compositions, for use as sealing compositions in can ends and to can ends containing these sealing compositions, particularly those compositions adapted for use in food containers. The compositions are quite stable in dry form for longer periods of storage time and impart substantially no odor or taste to foods. Compositions also have suitable viscosity for use in high speed application to can ends and require no curing or fluxing at elevated temperatures as do rubber or plasticol compositions.

Therefore it is an object of this invention to provide compositions for use as can end sealants which have excellent stability characteristics, particularly prior to solvent addition.

Another object of this invention is to provide a composition which imparts substantially no odor to taste to foods.

Yet another object is to provide a method wherein the components in dry form can be mill mixed and stored for long periods of time prior to dispersion of the dry components in a solvent.

A further object is to provide stable sealing compositions comprising a solvent system wherein the solvent is added after mill mixing the dry components such that the dry mix can be economically shipped free of the solvent.

A still further object of this invention is to provide a stable sealing composition wherein charcoal is added in situ to protect against taste and odor transfer to food.

Yet a further object of this invention is to provide a stable sealing compound which requires no curing, provides an excellent can end sealant, and imparts substantially no odor or taste to foods.

These and other objects will become readily apparent to one skilled in the art upon further consideration of the specifications and claims.

DETAILED DESCRIPTION

The compositions of this invention are produced by mill mixing the several dry components by milling and thereafter at a convenient time dispersing the dry mix in a solvent. The dry mixture thus obtained has a particularly high stability which permits storage or shipment for extended periods of time in the dry mixed form prior to dispersion in a solvent. Thus, the final cost of the dry mixed composition is less due to a lower storage and shipping costs.

In order to provide a composition for use as a sealant which imparts substantially no taste or odor to foods or other materials as well as a composition with excellent stability, particularly in the dry form, with very high resistance to heat degradation, along with good pouring and sealing properties requiring no curing in a solvent system, the component makeup of the composition is of necessity, quite specific.

The dry composition of the instant invention includes, as the necessary constituents, a styrene-butadiene rubber, a coumarone-indene type resin and a filler. A solvent may be added at a convenient time to produce the final composition ready for application to can ends.

Many polymers are well known as being useful in sealing compositions. The present compositions employ the use of emulsion-polymerized styrene-butadiene rubber, hereafter referred to as "SBR". SBR is of particular interest in providing good tack in the sealing compositions of this invention. Preferably, SBR should contain from about 20% to 25% bound styrene which allows the SBR to swell in solvent without dissolvency. More preferably, SBR having from about a 40 to 70 Mooney shear rate is used. From 80 to about 110 parts by weight SBR should be used in each composition, with preferably from about 80 to 100 parts by weight being included in the sealing compositions. The resin can be of the coumarone-indene type, having a melting point of from 100° C to about 145° C. and most preferably about 115° C. Another resin of interest is a cyclic hydrocarbons type resin, such as polycyclopentadiene, most preferably 1, 3 cyclopentadiene having a melting point from 100° C to about 145° C, preferably 120° C to about 135° C. Both the coumarone-indene and cyclic hydrocarbon type resins should be utilized in the compositions in amounts from 50 to about 80 parts by weight, preferably from 50 to about 70 parts by weight. The SBR and coumarone-indene type resins should be provided in the sealant compositions in amounts such that the sum of their parts by weight does not exceed 160 parts by weight in the composition.

Several fillers work in these sealing compositions. However, silica and clay are particularly useful because of their particle size, distribution, and shape. Silica and clay also provide a reinforcing effect when used in conjunction with SBR. The silica and clay should have a particle size of about 10 microns to be most effective. Filler should be added to the compositions in amounts from about 45 to 75 parts by weight and preferably from about 60 to 75 parts by weight.

Charcoal is important as an absorbent of odors and tastes that may be imparted by various components of the sealing compositions. While charcoal is commonly utilized as an adsorbent material in a separate process, the instant use in situ must be distinguished. In view of the constituents of the compositions, it is more surprising that the charcoal is not masked and rendered ineffective, by adding the charcoal in situ with all of the components. Charcoal is used in the compositions in amounts from about 2 to 5 parts by weight, preferably 5 parts by weight.

Zinc oxide and titanium dioxide are added as pigment for color and specific gravity control. Zinc oxide can be utilized in the compositions in amounts ranging from about 0 to 5 parts by weight, preferably from about 1 to 3 parts by weight and titanium dioxide can be utilized in the compositions in amounts ranging from about 1 to 5 parts by weight, preferably from about 1 to 3 parts by weight.

A stereometrically hindered phenolic type antioxidant having a melting point in the range from 225° C to about 270° C is preferably included. The phenolic antioxidant of particular interest is 1, 3, 5, trimethyl 2, 4, 6, tris [3, 5 ditert - butyl - 4 hydroxy-benzyl] benzene. This antioxidant has a molecular weight of about 775.2 and a melting point of about 244° C. It is very heat stable material allowing the sealing compound to withstand up to 400 hours of 212° F heat aging without complete loss of tack and flexibility.

Any aromatic hydrocarbon contamination generally will impart serious taste and odor problems in a sealant. High Standards concerning taste and odor must be maintained. Therefore, hexane and cyclohexane are the solvents used in the sealing compounds. These solvents, particularly hexane, are selected on the basis of their purity.

The sealing compounds are prepared by thoroughly mill mixing all the dry components. Once mixed, the components are then dispersed in the hexane solvent. It is of particular note that the dry components are quite stable after being mill mixed and it is not necessary to add a solvent immediately to the mixture to maintain stability as with other compositions. This particular stability characteristic provides an advantage in allowing shipment of the mixed dry components free of solvent thereby permitting obvious savings. The dry components can at a convenient time be dispersed in solvent, most desirably, hexane, and used as a sealing composition. Thus, storage over extended periods of time prior to the addition of solvent without substantial loss of quality is possible.

The following exaples illustrate the excellent properties and advantages of the compositions of this invention. All components are in parts by weight unless otherwise noted.

EXAMPLE I

The following dry components are mill mixed:
100 parts SBR polymer having a Mooney shear rate of 40 to 50;
60 parts clay having a particle size of about 10 microns;
60 parts of a coumarone-indene type resin having a melting point of about 115° C;
5 parts charcoal;
1 part zinc oxide
1 part 1, 3, 5, trimethyl 2, 4, 6, tris [3, 4, ditertbutyl-4-byrdoxybenzyl] benzene.

The mixed dry components are dispersed in 421 parts hexane solvent. The liquid sealing composition is easily pourable and is applied to a can end under high-speed assembly line conditions whereupon sealing composition is poured on each can end and spun to the outside edge of the can end whereupon the solvent evaporates promptly. A can end with a sealant thereon is used to seal a container and the resulting container is used to store food products. The can end provides an excellent seal with substantially no odor or taste contamination. In addition, the sealant is heat resistant with good tack and flexibility.

EXAMPLE II

The following dry components are mill mixed:
80 parts SBR polymer having a Mooney shear rate of about 40–50;
75 parts clay having a particle size of about 10 microns;
80 parts of a coumarone-idene type resin having a melting point of about 115° C;
5 parts charcoal;
3 parts zinc oxide;
3 parts titanium dioxide; and
1 part 1, 3, 5 trimethyl 2, 4, 6, tris [3, 5 ditert - butyl-4-hydroxybenzyl] benzene.

The mixed components are dispersed in 401 parts hexane solvent. The sealing composition is applied to a can end used to seal food products in a container as shown in Example I, above. The sealing composition provides an excellent heat resistant sealant with substantially no odor or taste contamination.

EXAMPLE III

Mill mixing the dry components of Example II whereupon the mixed dry components are stored in the dry form for a period of approximately 400 hours, after which hexane solvent is added in the amount given in Example II. The sealing composition is then applied to a can end by the method as explained in Example I. The sealing composition provides an excellent seal imparting substantially no odor or taste.

EXAMPLE IV

A standard extraction test was performed on Composition A, i.e., the composition of Example I compared to a standard commercially available can end sealant, Composition B comprising 45.5% polymer, 28.2% turpene resin, and 26.3% ash filler based on dry components dispersed in a solvent.

Both compositions were tested twice in a 24-hour period at 120° F in water and in a 20% concentration of ethyl alcohol.

In water, 5.3 parts per million or ppm of Composition A were extracted compared with 10.9 ppm of Composition B, and in the 20% concentration of ethyl alcohol 10.5 ppm of Composition A were extracted compared with 25.4 ppm of Composition B.

Thus, it was shown that Composition A of this invention imparts substantially no odor or taste contamination, the contamination being measured by the ppm extracted by the above tests.

It is therefore clear from the foregoing that the sealing compositions of this invention provide economy in being stable in dry mixed form. In addition, when solvent is added, the sealing composition is one particularly suited for high-speed application to can ends, has good tack and flexibility, and good pourability with good heat resistant characteristics, which imparts substantially no odor or taste, particularly to foods sealed within the containers to which the can ends are applied.

As will be evident to those skilled in the art, various modifications of this invention can be made, or followed, in the light of the foregoing disclosure and discussion without departing from the spirit thereof.

What is claimed is:

1. A can end sealant composition for food containers which imparts substantially no odor or taste to food packaged in said container consisting essentially of from 80 to 100 parts by weight of styrenebutadiene rubber with from about 20% to 25% bound styrene; from about 50 to 80 parts by weight of a resin selected from the group consisting of a coumarone-indene type resin and a polycyclopentadiene, said resin having a melting point from about 100°C. to 145°C, the total amount of said styrene-butadiene rubber and said resin being not more than 160 parts by weight of said composition; from about 45–75 parts by weight of a filler having an average particle size of about 10 microns and being selected from the group consisting of silica and clay; and about 2 to 5 parts by weight of charcoal to protect against taste and odor transfer to food packaged in said container.

2. The can end sealant composition of claim 1 which also includes about 400 to 450 parts by weight of a solvent selected from the group consisting of hexane and cyclohexane.

3. The can end sealant composition of claim 1 which also includes about 1 to 3 parts by weight of a stereometrically hindered phenol type antioxidant.

4. The can end sealant composition of claim 1 which also includes from about 1 to 5 parts by weight of titanium dioxide and a maximum of about 5 parts by weight of zinc oxide.

5. The can end sealant composition of claim 1 wherein said resin is coumarone-indene type resin having a melting point of about 115°C.

6. The can end sealant composition of claim 1 wherein said resin is 1,3-polycyclopentadiene having a melting point of from about 120°C to 135°C.

7. The can end sealant composition of claim 3 wherein said antioxidant is 1,3,5-trimethyl-2,4,6-tris-[3,5-ditertbutyl-4-hydroxy benzyl] benzene.

8. A can end for a food container, said can end having dispersed thereon a can end sealant composition which imparts substantially no odor or taste to food packaged in said container, said sealant composition consisting essentially of from 80 to 100 parts by weight of styrene-butadiene rubber with from about 20% to 25% bound styrene; from about 50 to 80 parts by weight of a resin selected from the group consisting of a coumarone-indene type resin and polycyclopentadiene, said resin having a melting point from about 100°C. to 145°C., the total amount of said styrene-butadiene rubber and said resin being not more than 160 parts by weight of said composition; from about 45–75 parts by weight of a filler having an average particle size of about 10 microns and being selected from the group consisting of silica and clay; and about 2 to 5 parts by weight of charcoal to protect against taste and odor transfer to food packaged in said container.

9. The can end of claim 8 wherein said sealant composition also includes about 400 to 450 parts by weight of a solvent selected from the groups consisting of hexane and cyclohexane.

10. The can end of claim 8 wherein said sealant composition also includes about 1 to 3 parts by weight of a stereometrically hindered phenol type antioxidant.

11. The can end of claim 8 wherein said sealant composition also includes from about 1 to 5 parts by weight of titanium dioxide and a maximum of about 5 parts by weight of zinc oxide.

12. The can end of claim 8 wherein said resin in said sealant composition is coumarone-indene type resin having a melting point of about 115°C.

13. The can end of claim 8 wherein said resin in said sealant composition is 1,3-polycyclopentadiene having a melting point of from about 120°C to 135°C.

14. The can end of claim 10 wherein said antioxidant in said sealant composition is 1,3,5-trimethyl-2,4,6-tris-[3,5ditertbutyl-4-hydroxy benzyl] benzene.

* * * * *